United States Patent [19]  [11]  4,353,819
McFadden  [45]  Oct. 12, 1982

[54] FAST CURING POLYEPOXIDE COATING COMPOSITIONS WITH GOOD POT LIFE

[75] Inventor: Russell T. McFadden, Freeport, Tex.

[73] Assignee: The Dow Chemical Company, Midland, Mich.

[21] Appl. No.: 243,278

[22] Filed: Mar. 13, 1981

[51] Int. Cl.³ ............................................. C08K 5/07
[52] U.S. Cl. ................................. 523/454; 427/386
[58] Field of Search ............... 260/32.8 EP; 427/386

[56] References Cited

U.S. PATENT DOCUMENTS

| | | | |
|---|---|---|---|
| 3,228,823 | 1/1966 | Usala et al. | 428/416 |
| 3,290,416 | 12/1966 | Christenson et al. | 428/416 |
| 3,372,149 | 3/1968 | Fertig et al. | 525/375 |
| 3,538,185 | 11/1970 | Davis et al. | 427/386 |
| 3,634,372 | 1/1972 | McFadden | 525/329 |
| 3,705,076 | 12/1972 | Usala | 428/421 |
| 3,719,629 | 3/1973 | Martin et al. | 260/33.2 EP |
| 4,214,039 | 7/1980 | Steiner et al. | 428/414 |
| 4,272,621 | 6/1981 | McFadden et al. | 525/355 |

OTHER PUBLICATIONS

Lee & Neville, "Handbook of Epoxy Resins", pp. 7-25, 7-26, (1967).

*Primary Examiner*—Joseph L. Schofer
*Assistant Examiner*—Bernard Lipman

[57] ABSTRACT

A nonvolatile amine, which is at least partially neutralized with a mixture of hydrochloric acid and either hydrobromic or hydriodic acid, dissolved in a solvent, is mixed with a volatile ketone and a polyglycidyl ether or ester to result in a thermosettable resin composition having extended pot life in bulk and a fast cure rate in thin sections.

18 Claims, No Drawings

FAST CURING POLYEPOXIDE COATING COMPOSITIONS WITH GOOD POT LIFE

BACKGROUND OF THE INVENTION

The use of polyepoxides, known as epoxy resins, in coating compositions has been well established for years. Such coatings have a spectrum of physical and chemical properties that make them well adapted for a variety of applications.

Polyepoxides are cured into a cross-linked, thermoset state by a variety of curing agent systems. The choice of curing agent system is generally a compromise between competing factors. It is usually desirable to have the coating cure as rapidly as possible. However, such a system will also cause premature gelation or at least an unacceptable viscosity increase in the composition before application to the substrate. Thus, either small amounts of composition can only be made prior to deposition of the coating or some sacrifice in cure rate has to be made to prolong the workable life of the composition, sometimes called the pot life of the composition.

One of the solutions to that problem has been to employ a curing agent system that is relatively stable at ambient conditions but cures rapidly at elevated temperatures. That technique is not available for all applications, however.

A method of providing water-borne epoxy paints which cure well even under unfavorable conditions of high humidity and cool temperatures was described in the copending application of McFadden et al., U.S. Ser. No. 103,330, filed Dec. 14, 1979 now U.S. Pat. No. 4,272,621. That teaching involved partially neutralizing a vinyl interpolymer having pendant aminoester group with a mixture of aqueous hydrochloric and hydrobromic acids; the whole mixture being a single liquid phase dissolved in a glycol ether solvent.

Such solvent-borne resins can be mixed with a polyepoxide, such as a diglycidyl ether of bisphenol A, the whole diluted with water, and, with or without pigmentation, a paint film may be cast from this mixture which cures to a hard, tenacious protective coating for steel, wood, glass and other substrates.

U.S. Pat. Nos. 3,719,629, 3,634,372 and 3,538,185 describe the use of both unneutralized and neutralized aminomethacrylate resins in organic solvents used in conjunction with bisphenol A diglycidyl ether resins to produce epoxy coatings having superior resistance to chalking and yellowing by sunlight.

The use of so-called "ketimines" in epoxy coating systems is well-known and widely practiced ("Handbook of Epoxy Resins", Lee and Neville, pp. 7-25 and 7-26, 1967, and "Epoxy Resins Chemistry and Technology", May and Tanaka, pp. 469-470, 1973). In general, ketimines are produced in a separate chemical process in which a polyamine curing agent and a ketone are heated in the presence of an acid catalyst, and water of reaction is removed by distillation, flash-evaporation, or other technique. Such operations are costly and involve boiling and condensing large quantities of highly flammable organic liquid. Alternatively, the ketone and amine may be packaged together as one part of the two-part amine/epoxy coating. In this case, much of the desirable effect of using ketimines, to wit, long pot life with good cure rate is lost. The retardation of gelation in the paint can is minimal with substantial viscosity increases in four to five hours.

SUMMARY OF THE INVENTION

Polyepoxide compositions having extended pot life in bulk form and fast cure rates in any form having high surface area comprise a mixture of a polyepoxide, a volatile ketone, and a solution in a solvent having no groups reactive with an amine of an acid salt of a nonvolatile amine and a mixture of hydrobromic or hydriodic acid with hydrochloric acid. The inventive concept also contemplates the process for curing such polyepoxide compositions by forming a mixture of (A) the solution of acid salt as defined above and a mixture of (B) the polyepoxide and ketone followed by blending (A) with (B), forming the mixture into the desired shape and allowing the blend to cure.

DETAILED DESCRIPTION OF THE INVENTION

The nonvolatile amines include those materials having a plurality of primary and/or secondary amino groups. By nonvolatile is meant that the amine is less volatile than the ketone employed in the mixture and is substantially nonvolatile at the temperature at which the subsequent cure is initiated.

A preferred group of nonvolatile amines include those polymers described in U.S. Pat. No. 3,634,372. Those polymers are vinyl interpolymers having aminoalkyl carboxylate substituents attached to the polymer chain. The aminoalkyl carboxylate groups are said to be those having the formula:

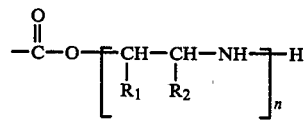

wherein $R_1$ and $R_2$ are independently selected from hydrogen or alkyl radicals of 1 to 4 carbon atoms and the average value of n is from 1.0 to 2.5. The polymers are prepared by polymerizing an unsaturated carboxylic acid, having no hydrogen on the alpha carbon, such as methacrylic acid, atropic acid, angelic acid or tiglic acid, with one or more comonomers followed by reaction of the carboxyl groups with ethylenimine or an N-(aminoalkyl)alkylenimine.

Other nonvolatile amines are also known including, for example, bisaminoalkyl ethers of bisphenols, such as bis(2-aminoethyl)ether of bisphenol A. Other nonvolatile amines will be apparent to the skilled worker.

The nonvolatile amine, such as an aminoethylated interpolymer, is acidified by simple mixing of the amine and acid in a suitable water-miscible or partially miscible solvent or solvent blend. Among such solvents are the lower alkyl ethers of ethylene, propylene, dipropylene and like glycols, representative of which are the ethyl ether of ethylene glycol, the butyl ether of propylene glycol, the propyl ether of diethylene glycol, and the isobutyl ether of mixed propylene glycol. Other water-miscible solvents will be known, such as the lower alkanols.

The acids used in acidifying the amine are mixtures of hydrobromic acid or hydriodic acid with hydrochloric acid. The mixture of acids should contain less than 30 mole percent hydrochloric acid to achieve optimum results. The amount of total acid mixture will be that amount required to neutralize from about 20 to 100 mole percent of the amine groups. The acid may be used in excess of that required for 100 percent neutralization. The preferred range is 40 to 60 percent.

The useful ketones are those that are volatile at the temperature to be employed in curing the final composition. Typical of such ketones are methyl ethyl ketone, acetone, methyl isobutyl ketone, cyclohexanone and acetophenone. The ketone will be miscible with or soluble in the solvent employed in forming the solution of the amine salt.

Polymerized vinyl interpolymers containing carboxylic acid groups are generally prepared from a solution of a mixture of monomers, one of which is a vinyl carboxylic acid monomer. The monomer mixture is polymerized in the presence of a catalyst and usually under controlled elevated temperatures with agitation until the polymerization reaction is complete. Various modifications commonly practiced with solution polymerization reactions can be utilized, modifications such as stepwise addition of the monomer mixture during the polymerization, incremental addition of catalyst, polymerization under an inert atmosphere, continuous or batch polymerization and the like. The details of such polymerizations are well known and need not be discussed further herein.

The vinyl interpolymer is prepared by copolymerizing an alpha-substituted unsaturated carboxylic acid with one or more copolymerizable monomers such as vinyl aromatic monomers, alkyl esters of unsaturated monocarboxylic acids, dialkyl esters of unsaturated dicarboxylic acids, vinyl and vinylidene chloride and fluoride, N-vinyl pyrrolidone and the like.

Suitable vinyl aromatic monomers include styrene, α-methylstyrene, vinyl toluene, the various alkyl substituted styrenes, the various halo-substituted styrenes, vinyl naphthalene and the like. The more preferred of these monomers are styrene, α-methylstyrene and vinyl toluene. Suitable alkyl esters of unsaturated mono- and dicarboxylic acids include the esters prepared from aliphatic alcohols containing from 1 to 12 carbon atoms and from cyclohexyl alcohol with the vinyl carboxylic acids cited previously. The acrylic and methacrylic esters are preferred; most preferred of these monomers are methyl, ethyl, isopropyl, butyl and 2-ethylhexyl acrylates or methacrylates. Various amounts of acrylonitrile, or methacrylonitrile, less than about 40 percent, may also be used to improve the film properties.

The vinyl interpolymers are preferably prepared with a sufficient amount of a vinyl carboxylic acid monomer to provide from about 1 to about 20 percent by weight of carboxylic acid (as —COOH) and the balance of said interpolymer is comprised of one or more of the copolymerizable monomers. Preferably, the carboxylic acid content ranges from about 3 to 12 weight percent (as —COOH).

Suitable solvents for the polymerization include alcohols, glycols, glycol ethers, and the like or mixtures thereof. The polymerization temperature may range from 60° to 140° C., with a preferred range of 80° to 100° C. The particular temperature is variable depending on the monomers, the catalyst and other conditions.

The aminoalkyl carboxylates useful in this invention are prepared by an amination reaction in which the vinyl carboxylic acid interpolymer in a suitable solvent is reacted with an excess of alkylenimine or an N-(aminoalkyl) substituted alkylenimine. Suitable alkylenimines include the 1,2-alkylenimines such as ethylenimine, propylenimine, butylenimine and the like and mixtures thereof. Ethylenimine is readily available in commercial quantities and is preferred. Also useful are the N-(aminoalkyl) substituted alkylenimines since they react similarly to the alkylenimines with a carboxylic acid group but are less volatile than the alkylenimines. Exemplary of these compounds are N-(2-aminoethyl) aziridine, N-(3-aminopropyl) aziridine, N-(2-aminopropyl) propylenimine, N-(2-aminobutyl) butylenimine and the like.

To obtain a plurality of amine groups per carboxylic acid group, at least 1.5 moles of an alkylenimine per equivalent of carboxylic acid are reacted with the organic solvent solution of the vinyl carboxylic acid interpolymer in order to obtain an average n value, according to the formula, of at least 1.0. Preferably, the number of moles of alkylenimine ranges from about 2 to about 5 giving an average n value of about 1.5 to 2.5. With the N-(aminoalkyl) alkylenimine, at least one mole, and preferably 1 to 1.5 moles, per equivalent of carboxylic acid is used.

The temperature of the amination reaction is best conducted above about 50° C. and preferably from about 50° to 100° C., although higher temperatures and superatmospheric pressures may be used.

After completion of the amination reaction, the solvent composition may be adjusted to comprise from 30 to 60 percent by weight of an alcohol solvent and from 70 to 40 percent by weight of a glycol ether. The final product may have a polymer concentration from 1 to 60 percent by weight depending on the polymer solubility and the particular application.

Other procedures for preparing the aminoalkyl interpolymer are known. One procedure is to treat a primary or secondary bromoalkyl acrylate with ammonia and interpolymerize the aminoalkylated monomer or to interpolymerize the bromoalkyl monomer and treat the polymer with ammonia. Another procedure is to interpolymerize the aminoalkyl acrylate or methacrylate hydrohalide, as, for example, 2-aminoethyl methacrylate.HX. Still another procedure is to interpolymerize monomers with pendant glycidyl groups, as glycidyl acrylate, and to treat the polymer with excess ammonia at elevated temperature and applied pressure.

A wide variety of polyepoxide resins may be readily made or are commercially available to prepare the coating compositions. One of the preferred classes of epoxy resins include the glycidyl polyethers of polyhydric phenols such as 4,4'-isopropylidene diphenol, commonly called bisphenol A. Other polyhydric phenols include resorcinol, catechol, hydroquinone, p,p'-dihydroxydiphenyl, p,p'-dihydroxy phenyl sulfone and the like. Flame retardant or self-extinguishing resins can be readily made from the halogen substituted, preferably bromine substituted, polyhydric phenols. The resins are generally made by reacting an epihalohydrin with the polyhydric phenol in the presence of a strong base. Typically, these resins contain more than one oxirane group, per molecule and the epoxide equivalent weight is defined as the weight in grams of the resin which contains one gram equivalent of epoxide.

Other polyepoxide resins which contain more than one epoxide group per molecule are glycidyl polyethers of polyhydric alcohols, glycidyl polyethers of novolac resins (commonly called epoxy novolacs) and a variety of resins wherein the epoxide group is introduced into the resin by the epoxidation of double bonds. The glycidyl polyethers of polyhydric phenols and polyhydric alcohols having an epoxide equivalent weight from about 150 to 2000 are preferred.

In addition to the polyepoxide resins described, vinyl polymers containing pendant glycidyl groups may also be utilized in this invention. Such vinyl glycidyl polymers may be made by copolymerizing a wide variety of vinyl monomers with a monomer such as glycidyl methacrylate. Suitable vinyl monomers include those which do not contain a group reactive with the glycidyl group and preferably include the $\alpha,\beta$-ethylenically unsaturated carboxylic acid esters of saturated alcohols containing from 1 to about 8 carbon atoms and the monovinyl aromatic monomers of the benzene class such as styrene, vinyl toluene and the like. Preferably, the polymer contains from about 5 to about 50 percent by weight of the vinyl glycidyl monomer. Other suitable vinyl glycidyl monomers include allyl glycidyl ether, glycidyl acrylate, diglycidyl maleate and the like.

The polyepoxide compositions of this invention may be conveniently formulated as two-package systems wherein one package comprises the acidified aminoethylated polymer, water miscible solvents, and, if desired, pigments, leveling agents, antifoam agents and other modifiers and the second package comprises the polyepoxide and ketone, and, if desired, suitable miscible solvents. Alternately, the second package can consist of a pigmented solution of polyepoxide and ketone. When it is desired to apply the coating to the desired substrate, the contents of the two packages are blended together and the resultant mixture applied to the substrate by brushing, spraying, etc. The containers and applicator are then easily cleaned by washing with warm water. It should be understood that the amount of water-miscible solvent required in the total composition need only be great enough to solubilize the acid neutralized amine resin with the other components of the mixture.

After mixing the two packages of components, the viscosity remains relatively stable and free of gelation for several hours. In other words, the compositions exhibit an extended pot life in bulk form. When deposited as a thin film or coating on a substrate, the compositions are cured in about 24 hours at 25° C. to a hard, solvent resistant, tightly adhering coating.

It is believed that concept of the invention provides the stated benefits because the amine and ketone are in equilibrium with the ketimine and water, which is present in minimum amounts. When the composition is disposed into a form having high surface area, as in a coating, the volatile ketone evaporates and under the influence of the acid from the acid salt, the equilibrium shifts rapidly to the free amine/ketone side providing the amine curing initiator. In bulk form, that equilibrium shift is far less pronounced and the composition is relatively stable. Further, the presence of amine.HX groups is believed to accelerate the film cure.

The compositions of this invention permit the preparation of higher solids formulations because the viscosity is relatively stable over a prolonged period of time. Prior systems were limited to comparatively low solids because of viscosity drift. In such systems the solids must be adjusted to what the viscosity will be after a given time passes. Higher solids formulations have significant economic advantages over those of lower solids because fewer coats are required to achieve a desired coverage, and because less organic solvent is released into the environment.

In addition, the prior systems using acidified amino resins as polyepoxide curing agents had a tendency to react with ferrous substrates resulting in a brown discoloration of the coating film. The compositions of this invention show a greatly reduced tendency or none at all toward that staining.

EXAMPLE 1

A two-liter reaction vessel was equipped for mechanical stirring, temperature measurement and control, nitrogen sparging, and continuous, metered addition of monomer and initiator. The reactor was thoroughly purged with $N_2$ gas, then to it was charged 455 grams of anhydrous n-butanol. This was heated with stirring to 100° C. To the reservoir of a monomer metering pump was charged the following mixture: styrene, 105 grams; n-butyl methacrylate, 155 grams; 2-ethylhexyl acrylate, 84 grams; and methacrylic acid, 77 grams. To a burette fitted to the reactor was charged 10.0 milliliters of liquid azo-N(tert. butyl)-N'-(isobutyronitrile).

The monomer metering pump was started, and the azo initiator was added in increments to the reactor according to the following schedule.

| Time After Starting Monomer Feed, Min. | Volume of Initiator Added, mls. |
|---|---|
| 15 | 4.2 |
| 50 | 1.1 |
| 95 | 1.1 |
| 140 | 1.2 |
| 290 | 1.2 |
| 365 | 1.2 |

The monomer feed was completed in three hours and thirty-five minutes, and 12½ hours after the beginning of the monomer feed the polymerization was terminated by cooling the mixture, which at 25° C. was a clear, colorless syrup.

The polymer solution was reheated to 80° C., and over a period of 10 minutes, 54.0 grams of ethylenimine was added, causing the temperature of the mixture to rise to 92°–93° C., then fall back slowly. The temperature was held at 80° C. for one hour, then 12.8 grams of 36 percent hydrochloric acid was added, and heating and stirring at 80° C. were continued for 4¾ hours. One and three-quarters hours later, with the mixture at 40° C., stirring was resumed and 82.9 grams of 49 percent hydrobromic acid was added over a 10-minute period. The mixture was stirred for 42 minutes more, then bottled. Its properties were as follows:

| Property | Value |
|---|---|
| Appearance | Nearly clear |
| Color | Gardner 2 |
| Bulk pH | 6.4–6.5 |
| Viscosity, 25° C.[1] | 3260 cps |
| Solubility in - | |
| toluene | clear, soluble |
| MEK | clear, soluble |
| MiBK | faint opalescence, sol. |
| perchloroethylene | clear, soluble |
| tetrahydrofuran | faint opalescence, sol. |
| i-propanol | clear, soluble |
| water | clear, soluble |
| methyl chloroform | clear, soluble |
| hexane | insoluble |

[1]Brookfield

The above resin solution was used in making a number of reactive coating compositions to determine the effect of different kinds of solvents on pot life and cure rate. The mixture composition was:

| Component | Weight or Volume |
|---|---|
| Aminomethacrylate Resin Solution | 60.4 gm |
| 2-ethoxyethanol | 20.6 gm |
| Diglycidyl ether of Bisphenol A (D.E.R. ® 331) EEW = 190[1] | 23.8 gm |
| Diluent | 38.3 ml |

[1] EEW = epoxide equivalent weight

After thorough mixing, the viscosities of the solutions were measured periodically. The results are listed in Table I. All of the following mixtures when cast as films while still fluid, cured overnight to hard, adherent, solvent resistant coatings over a variety of wood, metal, and glass substrates.

TABLE I

| | Viscosity After N Hours, cps | | | |
|---|---|---|---|---|
| Diluent | N = 1 Hour | 2 Hours | 4 Hours | 6 Hours |
| This Invention | | | | |
| Methyl ethyl ketone | 61 | 64 | 75 | 97 |
| Cyclohexanone | 122 | 130 | 143 | 160 |
| Acetone | 80 | 84 | 88 | 92 |
| Methyl isobutyl ketone | 90 | 96 | 126 | 200 |
| Acetophenone | 118 | 127 | 164 | 253 |
| For Comparison | | | | |
| Toluene | 84 | 104 | 315 | Gelled |
| n-Butanol | 150 | 290 | Gelled | — |
| Methyl chloroform | — | Gelled | — | — |

When the above formulations were applied as 4.0 mil (0.1 mm) films (dry film thickness) over sand blasted or primed steel, all yielded hard, resistant, tightly adhering, clear coatings in 24 to 36 hours at 25° C.

EXAMPLE 2

A diamine compound, the bis(2-aminoethyl) ether of bisphenol A, was neutralized with a mixture of 36 percent hydrochloric acid and 49 percent hydrobromic acid such that the molar ratio of the two acids was HCl/HBr=20/80, and this mixed diamine hydrohalide salt was further diluted with 2-ethoxyethanol to a solids content of 56.7 percent. This was then used in making reactive coating mixtures as follows:

| | Amount of Component In | |
|---|---|---|
| Component | Mixture A | Mixture B |
| Amino Resin Solution | 22.3 gm | 22.3 gm |
| D.E.R. ® 331[1] | 19.0 gm | 19.0 gm |
| Methyl Ethyl Ketone | 25.0 ml | none |
| Sec.-Butyl Alcohol | none | 25.0 ml |

[1] EEW = 190

The mixtures were allowed to stand at 24°–25° C., and the viscosity of each was measured periodically with the results shown in Table II.

TABLE II

| Viscosity After | Mixture A | Mixture B |
|---|---|---|
| 1 hour | 15.6 cps | 36.9 cps |
| 24 hours | 26 cps | 843 cps |
| 48 hours | 39 cps | 1709 cps |
| 72 hours | 51 cps | >10,000 cps |
| 96 hours | 74 cps | gelled |
| 2 weeks | still fluid | gelled |

Both mixtures formed films which cured about equally well.

EXAMPLE 3

In a reaction vessel like that of Example 1, the following components were formed into a solution copolymer:

| 2-ethoxyethanol | 600 gm |
|---|---|
| azobis(isobutyronitrile) | 13.2 gm |
| butyl acrylate | 239 gm |
| methyl methacrylate | 135 gm |
| styrene | 135 gm |
| methacrylic acid | 96.4 gm |

The solvent was charged to the reaction vessel and stirred while being heated to 80° C. The monomers were then added as a uniform mixture uniformly over a period of four hours. The initiator was added in increments according to a similar schedule to that of Example 1.

Ten hours after monomers feed was begun, the polymerization was terminated. Eight hundred grams of the colorless syrup was reacted with 63.5 grams of ethylenimine as in Example 1, but the mixture was neutralized with 59.9 grams of 36 percent hydrochloric acid two hours after finishing the ethylenimine addition, and with 135 grams of 56 percent hydriodic acid one hour after that.

The resulting clear, yellow polymer solution was made into reactive coating mixtures with the polyepoxide of Examples 1 and 2 and a diluent. The viscosities of these mixtures was measured over time with the results in Table III.

TABLE III

| | Weight of Component in | |
|---|---|---|
| Component | Mixture A | Mixture B |
| Polymer Solution of Example 3 | 100.0 gm | 100.0 gm |
| Bisphenol A Diglycidyl Ether (D.E.R. ® 331) | 50.0 gm | 50.0 gm |
| MEK | 50.0 gm | None |
| Sec.-Butyl Alcohol | None | 50.0 gm |

| Viscosities of Mixtures vs. Time | | |
|---|---|---|
| | Viscosity (cps) | |
| Time | A | B |
| 1 hour | 180 cps | 454 cps |
| 3 hours | 225 cps | gelling |
| 24 hours | gelled | gelled |

The retarding effect of the ketone is evident. A 4.0 mil (0.1 mm) film cast from Mixture A before it had advanced in viscosity, cured in 48 hours to a hard, tough coating over carbon steel. The great accelerating effect of the HI on the gelation, or cure rate is noteworthy.

What is claimed is:

1. A resin composition having extended pot life in bulk form and a fast cure rate in thin sections comprising a mixture of (A) a nonvolatile amine dissolved in a solvent having no groups reactive with an amine, said nonvolatile amine being at least partially neutralized with a mixture of hydrobromic acid or hydriodic acid and hydrochloric acid, (B) a volatile ketone, and (C) a polyglycidyl ether or ester.

2. The composition of claim 1 wherein said nonvolatile amine is a vinyl interpolymer containing polyaminoalkyl carboxylate groups.

3. The composition of claim 2 wherein said carboxylate groups have the formula

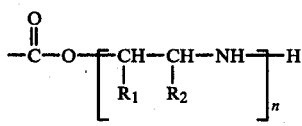

wherein $R_1$ and $R_2$ are independently selected from hydrogen or alkyl radicals of 1 to 4 carbon atoms and the average value of n is from 1.0 to 2.5.

4. The composition of claim 1 wherein said nonvolatile amine is bis(2-aminoethyl)ether of bisphenol A.

5. The composition of claim 1 wherein the nonvolatile amine component has from 20 percent to 100 percent of the amine groups acidified with the acid mixture.

6. The composition of claim 1 wherein the mixture of acids contains less than 30 mole percent hydrochloric acid with the remainder of hydrobromic acid or hydriodic acid.

7. The composition of claim 1 wherein said nonvolatile amine is dissolved in a lower alkyl ether of a lower alkylene glycol.

8. The composition of claim 7 wherein said lower alkyl ether is the ethyl ether of ethylene glycol.

9. The composition of claim 1 wherein said nonvolatile amine is dissolved in a cosolvent of a lower alkyl ether of a lower alkylene glycol and an alkanol.

10. The composition of claim 9 wherein said alkanol is n-butanol.

11. The composition of claim 1 wherein said volatile ketone is methyl ethyl ketone.

12. The composition of claim 1 wherein said volatile ketone is methyl isobutyl ketone.

13. The composition of claim 1 wherein said volatile ketone is acetone.

14. The composition of claim 1 wherein said volatile ketone is cyclohexanone.

15. The composition of claim 1 wherein said volatile ketone is acetophenone.

16. The composition of claim 1 wherein said volatile ketone is present in at least equivalent amounts to said nonvolatile amine.

17. The composition of claim 1 wherein said polyepoxide is a diglycidyl ether of bisphenol A.

18. A process for coating a substrate wherein an organic solvent solution of a nonvolatile amine salt of an amine having primary, secondary or primary and secondary amine groups neutralized with a mixture of hydrobromic or hydriodic acid with hydrochloric acid is blended with a solution of a volatile ketone and a polyepoxide, the so-formed blend deposited as a coating on said substrate, and the solvent and ketone evaporated and the polyepoxide caused to cure.

* * * * *